United States Patent
Nishizawa et al.

(10) Patent No.: US 7,369,964 B2
(45) Date of Patent: May 6, 2008

(54) METHOD AND APPARATUS FOR ISSUING REPAIR ALERTS IN A TRANSMISSION MECHANISM

(75) Inventors: Makoto Nishizawa, Numazu (JP); Harumichi Tokuyama, Odawara (JP); Tomonori Morita, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/535,098

(22) Filed: Sep. 26, 2006

(65) Prior Publication Data
US 2007/0093976 A1    Apr. 26, 2007

(30) Foreign Application Priority Data
Sep. 28, 2005    (JP) ............................ 2005-281871

(51) Int. Cl.
G06F 15/00    (2006.01)
(52) U.S. Cl. ...................................... 702/184; 702/182
(58) Field of Classification Search ................ 702/71, 702/82, 184, 182
See application file for complete search history.

(56) References Cited

U.S. PATENT DOCUMENTS
6,053,047 A * 4/2000 Dister et al. ................... 73/593
6,289,735 B1 * 9/2001 Dister et al. ................... 73/579

FOREIGN PATENT DOCUMENTS
JP    2001-175303    6/2001

OTHER PUBLICATIONS
Pamphlet of sound wave type belt tension U-507, 5000 sheets issued by Gates Unitta Asia on Apr. 23, 2004.
English Translation of Japanese Patent Abstract published on Jun. 29, 2001 under Publication No. JP2001-175303.
* cited by examiner Primary Examiner—John E. Barlow, Jr.
Assistant Examiner—Douglas N Washburn
(74) Attorney, Agent, or Firm—DLA Piper US LLP

(57) ABSTRACT

White noise is applied to a servocontrol system of a servomotor in order to measure a frequency characteristic of a mechanical component in an electric injection molding machine, and a signal from an encoder is applied to a fast Fourier converter. Data from the fast Fourier converter is applied to a memory unit, and the content of the memory unit is displayed on a display unit in the form of a board diagram. Repair announcement is issued when a deviation of the resonant frequency of each mechanical component with respect to data at an initial setting time exceeds a predetermined value.

9 Claims, 5 Drawing Sheets

METHOD AND APPARATUS FOR ISSUING REPAIR ALERTS IN A TRANSMISSION MECHANISM

CROSS-REFERENCE TO RELATED APPLICATIONS

This application is based upon and claims the benefit of priority from prior Japanese Patent Application No. 2005-281871, filed Sep. 28, 2005, the entire contents of which are incorporated herein by reference.

BACKGROUND OF THE INVENTION

1. Field of the Invention

The present invention relates to a method and apparatus for issuing repair alerts for various mechanical components assembled in an electric injection molding machine, and more particularly, to a method and apparatus for issuing repair alerts which automatically execute diagnostic processing to determine the need for repair without requiring action by a worker in charge of operation of the electric injection molding machine.

2. Description of the Related Art

Common electric injection molding machines can use servomotors, for example, AC servomotors instead of hydraulic drives. Generally, a rotary drive of the servomotor is applied to a rotation direct-transmission mechanism, in which a nut and a ball screw are combined, through a pulley and a timing belt, thereby shortening the entire length of the injection molding machine to achieve space saving for installation.

The operating condition of such an electric injection molding machine varies depending on an individual user. For an electric injection molding machine having a high operation rate, the period between inspections needs to be short, that is, the frequency of inspection needs to be high. Under such circumstances, a worker spends much time taking direct measurements during inspections, and even more time processing the measured data to predict when a repair may be needed.

Particularly, with regard to inspection of timing belts, which are arranged dispersedly, the worker needs to compare tension measured using a tension meter and that of the initial state from values or visually from graphical values, listening to noise generated by the machine and inferring from experience, or the like for each timing belt.

Recently, a portable sound wave type belt tension meter capable of measuring the tension of a timing belt with sound waves has been provided to facilitate the measurement of the tension to some extent (refer to, for example, pamphlet of sound wave type belt tension U-507, 5000 sheets issued by Gates Unitta Asia on Apr. 13, 2004).

In the above-described conventional method, which captures change over time of components in the drive force transmitting mechanism of the servomotor, the issuance of repair alerts is not executed automatically. This is because a worker is always needed. Only a skilled person can determine such a change since a portion of the inspection depends on visual check or acoustic sense. It takes more time to perform such a procedure. Furthermore, there may be a difference in the outcome of the inspection as it depends on the individual person performing the inspection and evaluating the outcome.

In another conventional method, vibration is applied to a structure body of a machine with a vibration exciter and its vibration waveform is detected at other portions of the structure with a sensor so as to analyze the characteristic of the vibration by waveform analysis. Such a method exaggerates the measurement work itself including setting the vibration exciter and arranging a sensor. Furthermore, analysis of cause-and-effect relationship in the vibration is not easy.

Recently, a fast Fourier-converting method has been proposed. In the method, a signal from an encoder is converted by fast Fourier transform by applying white noise for gain adjustment of the servosystem in a numerical control machine tool (refer to, for example, Jpn. Pat. Appln. KOKAI Publication No. 2001-175303).

The white noise principally contains all the frequency components. Each frequency component has substantially the same amplitude. Any conventional white noise generator can be used.

As described above, the method, which captures change overtime of components in the drive force transmitting mechanism of the servomotor, does not allow the repair alert to be issued easily. This is because a worker is always needed. In addition, only a skilled person can determine such a change since a portion of the inspection depends on visual check or acoustic sense. Such inspection procedure takes time, and there may be a difference in the outcome of the inspection depending on the individual person evaluating the outcome.

BRIEF SUMMARY OF THE INVENTION

An aspect of the present invention is to provide a method for issuing a repair alert and a repair alerting apparatus capable of issuing a repair alert for a mechanical component without the worker performing an individual measurement.

According to one aspect of an embodiment of the present invention, there is provided a method for issuing a repair alert for a mechanical component, including:

a) measuring a first frequency response characteristic of the mechanical component at installation of the mechanical component;

b) determining a first resonance frequency of the mechanical component from the first frequency response;

c) measuring a second frequency response characteristic of the mechanical component after a predetermined operating time elapses;

d) determining a second resonance frequency of the mechanical component from the second frequency response; and e) issuing a repair alert of the mechanical component when a deviation between the first resonance frequency and the second resonance frequency exceeds a predetermined allowable value.

According to an embodiment of the invention, diagnostics of a mechanical component of an electric injection molding machine or the like is automatically executed to issue an alert for repair. Consequently, a worker is relieved of a substantial measurement work. Furthermore, content of the measurement and measurement result can be displayed on a display device in the form, for example, of a board diagram and measurement data can be written over the board diagram. Therefore, changes with time of the mechanical component can be compared with past data.

Another aspect of the present invention is to provide a repair alerting apparatus which issues a repair alert for a mechanical component, including:

a) a first device which measures a first frequency response characteristic of the mechanical component at installation of the mechanical component;

b) a second device which determines a first resonance frequency of the mechanical component from the first frequency response;

c) a third device which measures a second frequency response characteristic of the mechanical component after a predetermined operating time elapses;

d) a fourth device which determines a second resonance frequency of the mechanical component from the second frequency response; and e) a fifth device which issues a repair alert for the mechanical component when a deviation between the first resonance frequency and the second resonance frequency exceeds a predetermined allowable value.

In the repair alerting apparatus of the present invention, measurement data can be obtained from a fast Fourier converting section by applying white noise to a servocontrol system of a servomotor. Thus, the worker does not need to arrange a detector or sensor for the measurement. The apparatus can acquire measurement data automatically at any time.

Additional features of the invention will be set forth in the detailed description which follows, and in part will be obvious from the description, or may be learned by practicing the invention. The various features of the invention may be obtained by means of the instrumentation and combinations particularly pointed out hereinafter.

BRIEF DESCRIPTION OF THE DRAWINGS

The accompanying drawings, which are incorporated herein, and which constitute a part of the specification, illustrate embodiments of the present invention, and together with the general description given above and the detailed description of the embodiments given below, serve to explain the principles of the invention.

DETAILED DESCRIPTION OF SEVERAL EMBODIMENTS OF THE INVENTION

Hereinafter, embodiments of the present invention will be described in detail with reference to the accompanying drawings.

Figure 1:
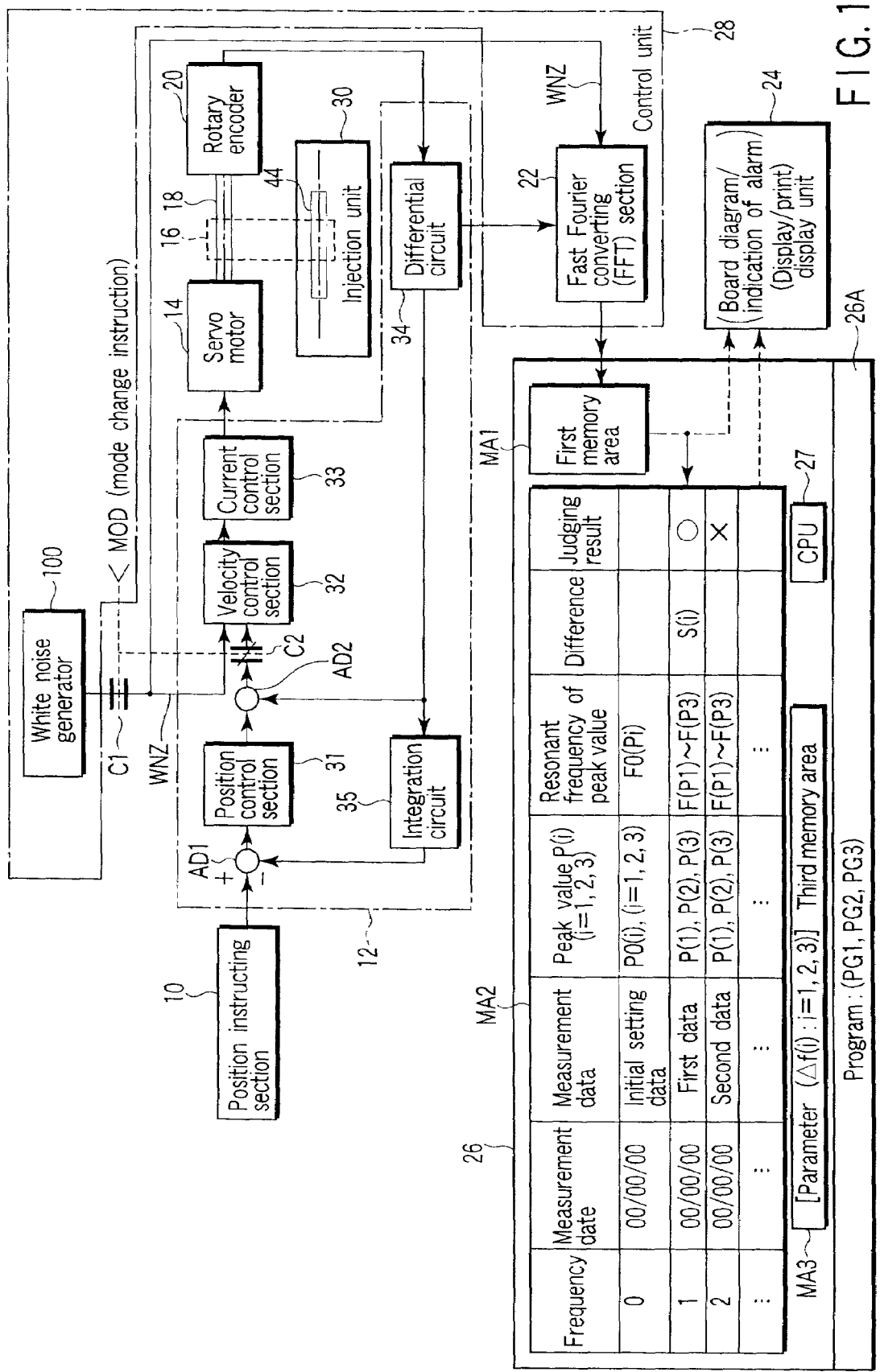
FIG. 1 is a block diagram showing portions of an apparatus for measuring a frequency characteristic of mechanical components in an electric injection molding machine, according to an embodiment of the present invention.

FIG. 1 is a block diagram showing major portions of a repair alerting apparatus for measuring a frequency characteristic of a mechanical component in an electric injection molding machine, according to an embodiment of the present invention. In FIG. 1, reference numeral 10 denotes a position instructing section which is part of a control unit of the electric injection molding machine. Reference numeral 12 denotes a servocontrol system (control block) which applies a drive instruction current to the servomotor 14. An output shaft 18 of a servomotor 14 is provided with a rotary encoder 20. An end of a timing belt 16 is attached to the output shaft 18 through a pulley (not shown). The other end of the timing belt 16 is attached to a ball screw shaft 44 of an injection unit 30 described later. The ball screw shaft 44 serves as a load of the servomotor 14.

The servocontrol system 12 includes an adder AD1, a position control section 31, a velocity control section 32, a current control section 33, a differential circuit 34. The differential circuit 34 generates a velocity feedback signal by calculating a difference of outputs (pulse string) from the encoder 20 and applies the signal to the adder AD2. The servocontrol system 12 also includes an integration circuit 35. The integration circuit 35 generates a position feedback signal by integrating the velocity feedback signal and applies the signal to the adder AD1.

Reference numeral 100 denotes a white noise generator for generating white noise WNZ. The white noise WNZ is a white noise signal which contains substantially all the frequency components for the present purpose. Reference numeral 22 denotes a fast Fourier converting section. An output of the differential circuit 34 is input to the converting section 22, and the white noise WNZ from the white noise generator 100 is also input to the converting section 22.

Contact points C1, C2 for setting the servocontrol system 12 to a measurement mode can be switched over by a mode change instruction MOD from a control unit 28. The white noise WNZ is input to the velocity control section 32 according to the change instruction MOD so as to separate the position control section 31 from the velocity control section 32.

Reference numeral 26 denotes a memory unit. The memory unit 26, includes a first memory area MA1 and a second memory area MA2. The first memory area MA1 directly stores output data from the fast Fourier converting section 22. The second memory area MA2 stores data of the first memory area MA1, a resonance point peak value P(i) of each mechanical component based on the data, a resonant frequency F(i) of the peak value, a deviation value S(i) of the resonant frequency F(i) with respect to the data at initial setting time, and a determining result of whether or not the deviation value S(i) exceeds an allowable range Δf(i). The allowable range Δf(i) is set preliminarily in a third memory area MA3. The memory unit 26 further includes a memory area 26A for storing programs PG1, PG2 and PG3.

The program PG1 is a diagnostic program. The program PG2 is a program for calculating data such as the peak value, resonant frequency, deviation value, and for determining result calculated based on the data in the first memory area MA1. The program PG2 can also store the data stored in the first memory area MA1 and the data obtained by the calculation in the second memory area MA2. The program PG3 is a program for displaying data stored in the first memory area MA1 or data stored in the second memory area MA2 on a screen of a display unit 24 in the form of a board diagram. These programs PG2 and PG3 constitute a subroutine of the program PG1. The contents of the respective PG1 to PG3 are read and executed by a CPU 27. CPU 27 is a processing unit that can be included in the memory unit 26. However, the CPU 27, the programs PG1, PG2 and PG3, and the third memory area MA3 may also be provided in another control unit 28 instead of the memory unit 26. The white noise generator 100 and the fast Fourier converting section 22 are incorporated as components in the control unit 28.

Figure 2A:
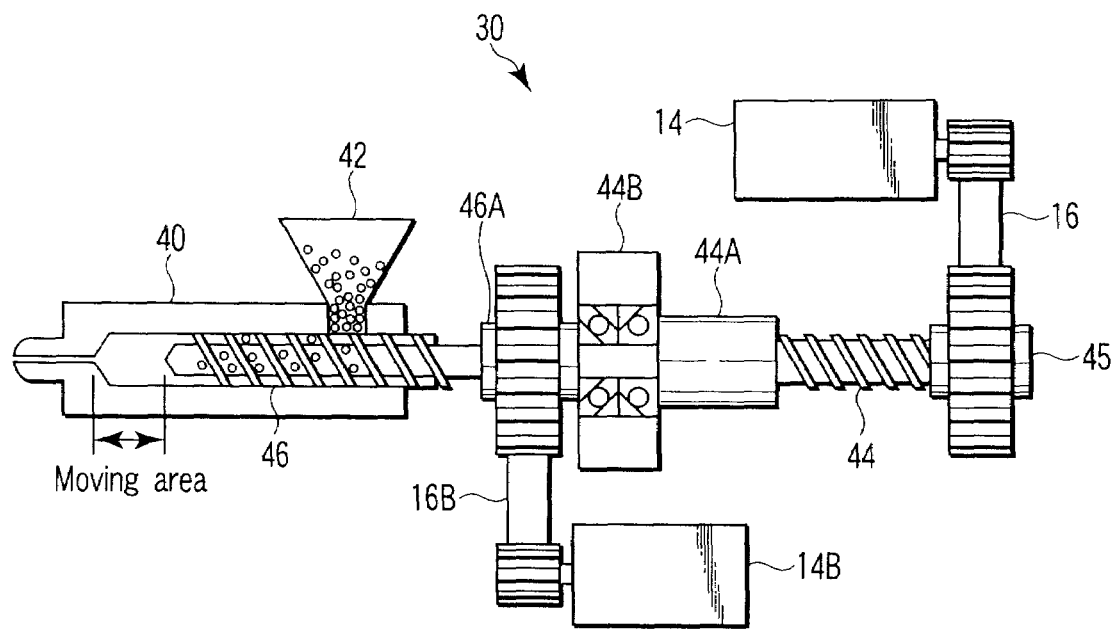
FIG. 2A is a longitudinal sectional view taken along an injection axis of an injection unit of the electric injection molding machine according to an embodiment of the present invention.
Figure 2B:
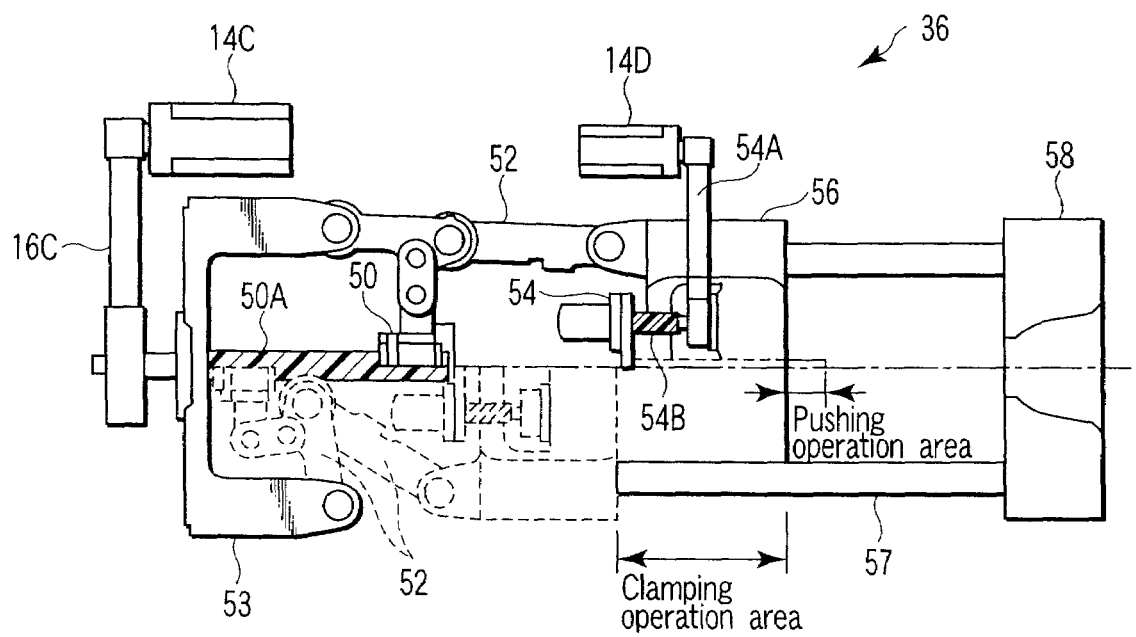
FIG. 2B is a longitudinal sectional view of a clamping unit of the electric injection molding machine, according to an embodiment of the present invention.

FIGS. 2A and 2B show portions of the injection unit 30 and a clamper unit 36 that may be included in the electric injection molding machine. FIG. 2A is a longitudinal sectional view of the injection unit 30 taken along the injection axis direction, and FIG. 2B is a longitudinal sectional view of the clamper unit 36 taken along a moving direction of a movable die plate 56.

In FIG. 2A, reference numeral 40 denotes a barrel, 42 denotes a hopper, 46 denotes a screw for injection, and 44 denotes a ball screw shaft. A rotation of the servomotor 14 is transmitted to advance and/or retract the screw. The rotation is transmitted as a rotation of a ball nut 45 through the timing belt 16 so as to advance or retract the ball screw shaft 44 in the axial moving direction. A base 44A can advance or retract in the axial direction integrally with the ball screw shaft 44. The base 44A is connected to a pulley section 46A through a bearing section 44B such that no rotation is transmitted. Thus, a rotation of the servomotor 14B for screw rotation is transmitted from the pulley to the screw 46 through the timing belt 16B.

The clamper 36 of FIG. 2B is provided with the movable die plate 56 which opposes a fixed die plate 58 at the right end of the figure. The clamper 36 advances/retracts along a tie-bar 57. The left side of the movable die plate 56 on the figure is coupled with a toggle link 52. An upper side of FIG. 2B shows the toggle link 52 in a state of substantially stretched, while a lower side of FIG. 22B shows the toggle link 52 in a state of being substantially contracted. A cross head 50 is coupled with an intermediate link of the toggle link 52, and the head fixed with a nut is screwed together with a ball screw shaft 50A. The ball screw shaft 50A is driven by a die clamping servomotor 14C through the pulley and timing belt 16C. Thus, the cross head 50 is advanced or retracted in the axial direction by a rotation of the servomotor 14C, so that the toggle link 52 is stretched or contracted as shown in the figure so as to advance or retract the movable die plate 56 with respect to the fixed die plate 58. Also, the left end of the toggle link 52 is attached to a link housing 53. The position of the link housing 53 in the axial direction is adjusted depending on the thickness of the die (die height). Reference numeral 14D denotes a component for advancing or retracting a push plate 54 for pushing out a molded article. The component 14D advances or retracts the ball screw shaft 54B through the timing belt 54A and a nut. The screw shaft 54B may be provided integral with the plate 54.

Figure 3A:
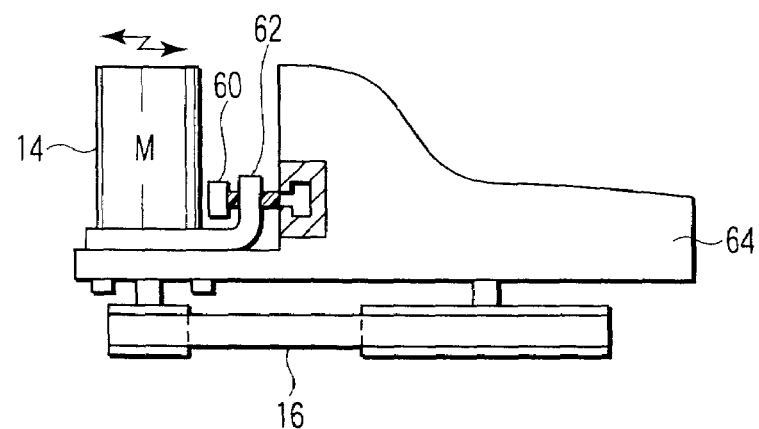
FIG. 3A is a plan view showing a positional relationship between a screw advancement/retraction servomotor and a timing belt of the injection unit of FIG. 2A.
Figure 3B:
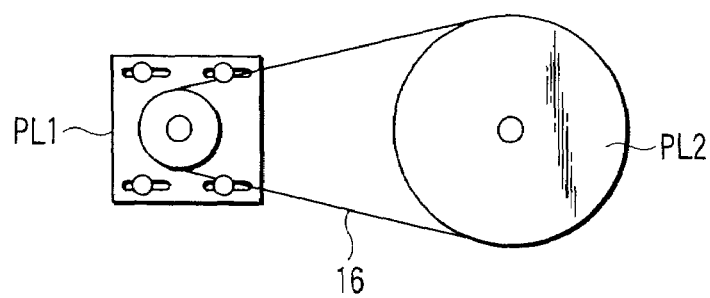
FIG. 3B is a front view showing the positional relationship of the timing belt and the servomotor.
Figure 3C:
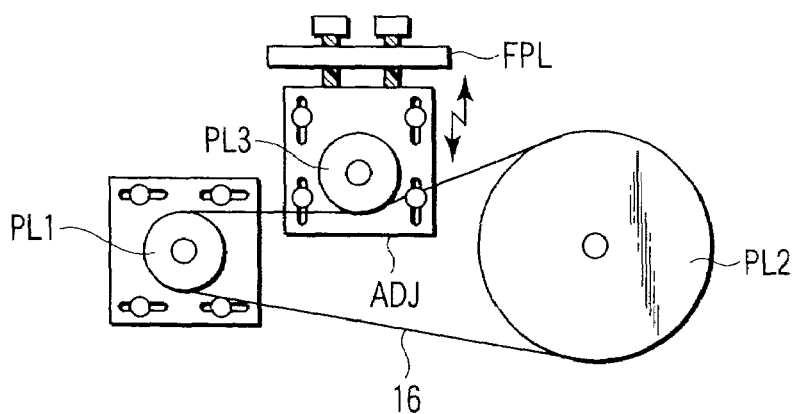
FIG. 3C is a diagram showing means for adjusting the degree of tension of the timing belt.

FIGS. 3A to 3C are diagrams showing a positional relationship between the servomotor 14 for screw advancement/retraction of the injection unit 30 and the timing belt 16 in FIG. 2A. FIG. 3A is a plan view, FIG. 3B is a front view. FIG. 3C shows means for adjusting the tension of the belt. FIGS. 2A and 2B indicate that the output shaft of the servomotor 14 fixed to a mounting member 62 on a fixing base 64 can be displaced in the right and left direction in the figure by an adjustment screw 60. This allows to adjust the tension of the timing belt 16 applied to the outer periphery of the pulleys PL1 and PL2.

In FIG. 3C, the tension of the timing belt can be adjusted by adjusting a tension adjusting section ADJ. The section ADJ is provided with another pulley PL3. The section ADJ can be positioned halfway of the belt, vertically from a base FPL provided on the fixing position side with a screw instead of shifting the position of the servomotor 14 as indicated in FIGS. 3A and 3B.

The above-described electric injection molding machine can include the same number of drive power transmitting mechanisms as that of installed servomotors. Periodic inspection and maintenance may be needed to maintain an appropriate operating condition. During the periodic inspection and maintenance, inspection locations, inspection content and inspection cycle are different depending on each inspection and maintenance. For example, the inspection content and inspection cycle are not the same for the timing belt and for a coupling section of the ball screw shaft and nut. That is, over time fatigue of the timing belt occurs due to stress. The stress can occur repeatedly during the operation of the timing belt. The amount of stress depends on material of the timing belt as well as change over time of abrasion at the coupling section. Material change and abrasion are quite different in terms of degree of progress. Consequently the timing belt, may require a higher inspection frequency. For this reason, the inspection of other components such as the coupling section may not performed at the time of inspection of the timing belt.

However, a manufacturer of the injection molding machine may provide a system, which allows inspected portions of the electric injection molding machine installed on the user side to be repaired when the machine is still in an appropriate operating condition. Periodic inspection may be needed in order to prevent the machine from suddenly failing due to a fault or the like.

Consideration has been made with respect to the above-described problems about issuing an alert for repair of mechanical components of an injection molding machine such as the timing belt, ball screw shaft and nut. Particularly, a system for issuing an alert for repair of the transmitting mechanism for transmitting a drive force of the servomotor may be implemented. A frequency of a resonance of a mechanical component is shifted with time. By processing data obtained by fast Fourier and converting a signal from the encoder with white noise applied to the servocontrol system of the servomotor the shift of the resonance can be quantified.

Next, the operation contents of the programs PG1, PG2 and PG3 by the CPU 27 with the above-described configuration will be described with reference to a flowchart of FIG. 4.

Figure 4:
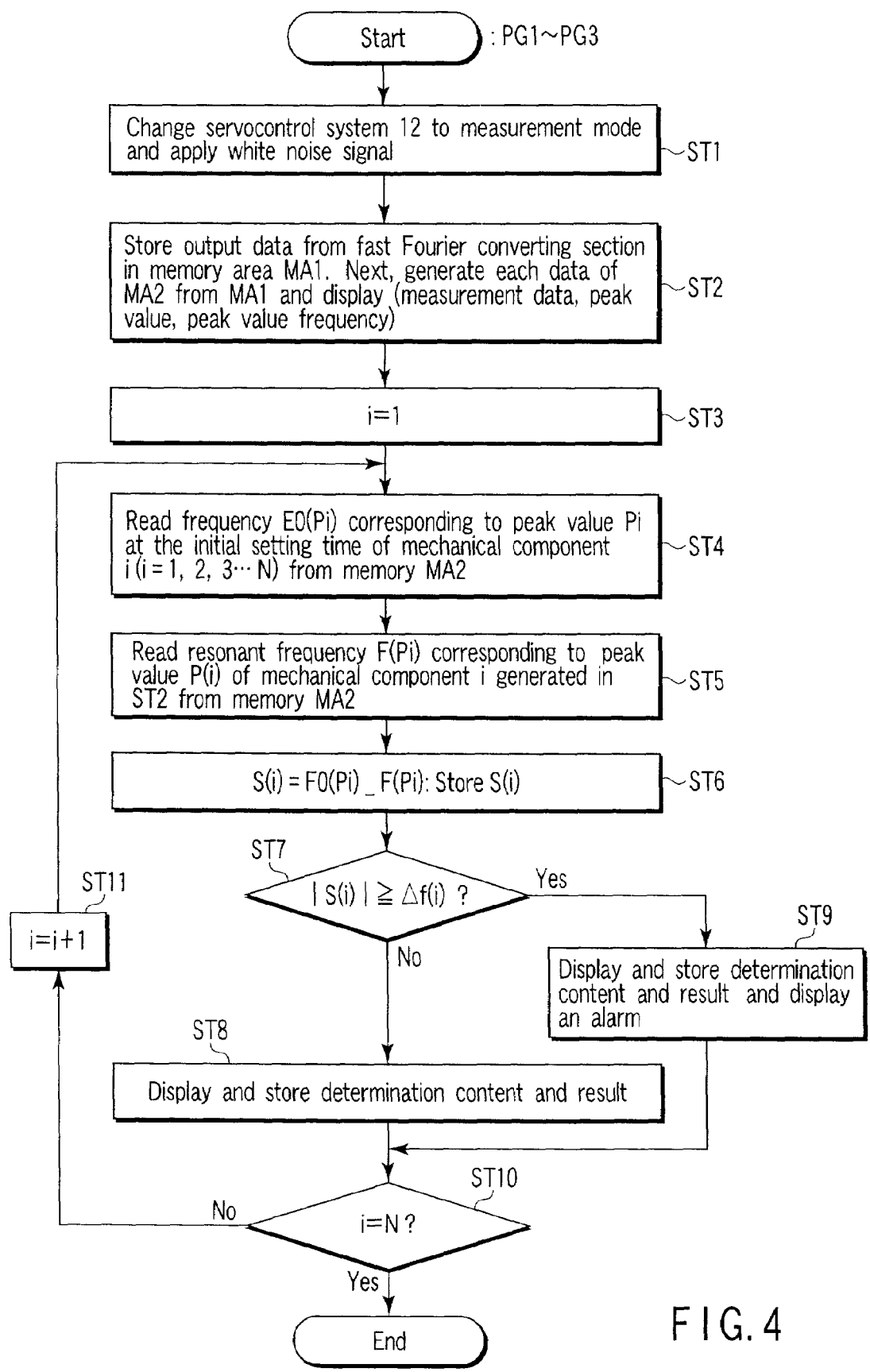
FIG. 4 is a flowchart for explaining the content of a diagnostic program, according to an embodiment of the present invention.

Referring to FIG. 4, the mode change instruction MOD is output from the control unit 28 to the contact points C1 and C2 at step ST1, so that the servocontrol system 12 is changed over to a measurement mode and the white noise WNZ is transmitted from the white noise generator 100.

Next, at step ST2, output data from the fast Fourier converting section 22 is stored in the first memory area MA1. Furthermore, data of the first memory area MA1 and respective data about a resonance point peak value $P(i)$ of each mechanical component, a resonant frequency $F(i)$ of the peak value and a deviation value $S(i)$ of the resonant frequency $F(i)$ with respect to the data at initial setting time, generated based on the data of the first memory area MA1, are stored in the second memory area MA2. These data are displayed on the screen of the display unit 24. In this case, these data may be displayed together with measurement data at the initial setting time.

Next, at step ST3, an index i of each mechanical component, which is an object of a measurement, is set to 1.

Then, at steps ST4 and ST5, the resonant frequencies F0(Pi) and F(Pi) of each mechanical component i obtained by measurement at the initial setting time and after operation for a predetermined period, respectively, are read. At step ST6, a deviation S(i) is obtained. At step ST7, a determination is made as to whether or not the deviation value (absolute value) is within an allowable range. The determination result is stored in the second memory area MA2. If the allowable range is exceeded, the determination content is stored in the second memory area MA2 at step ST9, and an alert for repair is issued. For example, an alarm is displayed on the display unit 24.

If the result is within the allowable range at step ST7, the determination result is stored in the second memory area MA2, and a message, indicating there is leeway before the alert for repair is to issue, is displayed on the display unit 24.

Next, at step ST 10, it is determined whether or not an index i of a certain mechanical component, which is an object of a measurement, reaches a number N. If i=N, the procedure ends. Otherwise, i=i+1 is performed at step ST1, and the procedure proceeds to step ST4.

Figure 5:
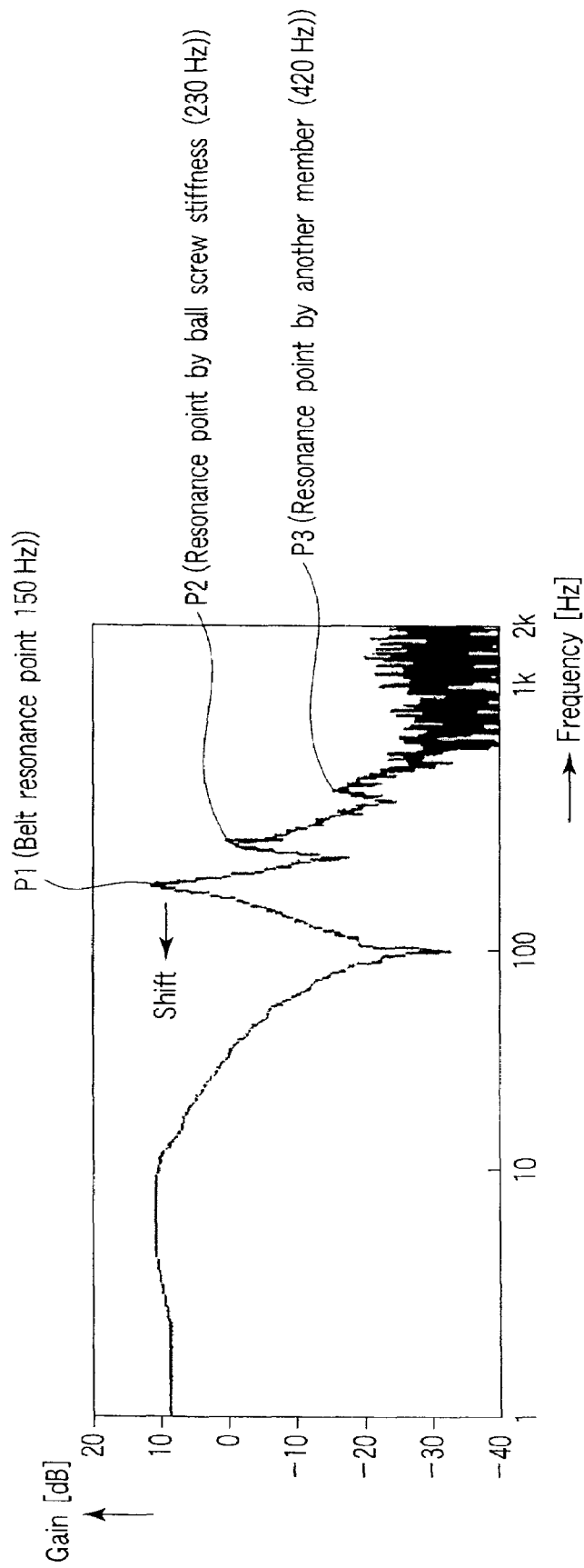
FIG. 5 is a diagram displayed on a display unit showing a board line including a resonance point of each mechanical component based on single measurement data.

FIG. 5 shows the resonance points P1, P2 and P3 of each mechanical component based on a single measurement data displayed on the board diagram. This example corresponds a case where the aforementioned N is 3, in which i=1 corresponds to the timing belt, i=2 corresponds to the ball screw shaft, and i=3 corresponds to other components, which are mechanical components. From this measurement, it can be observed that the resonance point of each mechanical component is usually shifted to the left with time due to wear, stress, etc. during operation. The amount of shift varies depending on each component. Each amount of shift enables the issuance of a repair alert for each mechanical component. That is, when a deviation value with respect to the data at initial setting time of the resonant frequency of each mechanical component exceeds a predetermined value, the repair alert is issued.

According to an embodiment of the invention, as described above, the repair alert is issued to alert for a repair of a mechanical component without depending on any worker's measurement.

Although the embodiments of the invention have been described above, the present invention is not restricted to these exemplified embodiments but may be modified in various ways. For example, the white noise WNZ can be applied to the servocontrol system at the same time that a position instruction is applied, without changing modes.

Additional features, aspects and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for issuing a repair alert for a transmission mechanism that transmits a driving force of a servomotor, comprising:
    measuring a first frequency response characteristic of the transmission mechanism at installation of the transmission mechanism by applying white noise to a servocontrol system of the servomotor and measuring a feedback of rotation of the servomotor with an encoder;
    determining a first resonance frequency of the transmission mechanism from the first frequency response;
    measuring a second frequency response characteristic of the transmission mechanism after a predetermined operating time elapses by applying white noise to the servocontrol system of the servomotor and measuring a feedback of rotation of the servomotor with the encoder;
    determining a second resonance frequency of the transmission mechanism from the second frequency response; and
    issuing a repair alert for the transmission mechanism when a deviation between the first resonance frequency and the second resonance frequency exceeds a predetermined allowable value.

2. The method according to claim 1, further comprising storing the first frequency response as a first frequency response data in a memory, reading the first frequency response data from the memory, and displaying the first frequency response data on a board diagram on a screen of a display device.

3. The method according to claim 2, further comprising repeating the measuring of the second frequency response characteristic of the transmission mechanism to obtain a plurality of frequency response measurements at different times, and writing the plurality of measurements on the board diagram on the screen of the display device so as to display a change of the second frequency response characteristic over time.

4. A repair alerting apparatus configured to issue a repair alert for transmission mechanism that transmits a driving force of a servomotor, comprising:
    a first device configured to measure a first frequency response characteristic of the transmission mechanism at installation of the transmission mechanism by applying white noise to a servocontrol system of the servomotor and measuring a feedback of rotation of the servomotor with an encoder;
    a second device configured to determine a first resonance frequency of the transmission mechanism from the first frequency response;
    a third device configured to measure a second frequency response characteristic of the transmission mechanism after a predetermined operating time elapses by applying white noise to the servocontrol system of the servomotor and measuring a feedback of rotation of the servomotor with an encoder;
    a fourth device configured to determine a second resonance frequency of the transmission mechanism from the second frequency response; and
    a fifth device configured to issue a repair alert for the transmission mechanism when a deviation between the first resonance frequency and the second resonance frequency exceeds a predetermined allowable value.

5. A repair alerting apparatus according to claim 4, wherein the first device includes:
    a servomotor arranged in an electric injection molding machine;
    a servocontrol system in communication with the servomotor, the servocontrol system being configured to control the servomotor;
    a white noise generator in communication with the servocontrol system, the white noise generator being configured to generate white noise to be applied to the servocontrol system;
    an encoder in communication with the servomotor, the encoder being configured to feedback a rotation of the servomotor;

a fast Fourier converter in communication with the white noise generator and the encoder, the fast Fourier converter being configured to receive a difference between white noise from the white noise generator and an output of the encoder and apply fast Fourier conversion to the difference;

a memory unit in communication with the fast Fourier converter, the memory unit being configured to store output data from the fast Fourier converter; and a display device in communication with the memory unit the display device being configured to display contents of the memory unit.

6. The repair alerting apparatus according to claim 5, wherein the memory unit includes:

a first memory area configured to store output data from the fast Fourier converter; and a second memory area configured to store data of the first memory area, a resonance frequency of the transmission mechanism calculated based on the data, and a deviation value of the resonance frequency with respect to data at initial setting time of the transmission mechanism.

7. The repair alerting apparatus according to claim 6, wherein the memory unit further includes a program which converts data of the first memory area and stores the converted data in the second memory area.

8. The repair alerting apparatus according to claim 7, wherein the memory unit further includes a program which displays data of the second memory area on a screen of the display device in the form of a board diagram.

9. The repair alerting apparatus according to claim 5, further comprising a servocontrol system mode changing device in communication with the servocontrol system, the servocontrol system mode changing device being configured to change the servocontrol system to a measurement mode so as to activate the first device.

* * * * *